US009147104B2

(12) United States Patent
Adiga et al.

(10) Patent No.: US 9,147,104 B2
(45) Date of Patent: Sep. 29, 2015

(54) SYSTEMS AND METHODS FOR PROCESSING LOW CONTRAST IMAGES

(71) Applicant: The United States of America as Represented by the Secretary of the Air Force, Washington, DC (US)

(72) Inventors: Umesh Adiga, Centerville, OH (US); Thomas J. Lamkin, Fairfield, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 35 days.

(21) Appl. No.: 14/069,434

(22) Filed: Nov. 1, 2013

(65) Prior Publication Data

US 2014/0126802 A1 May 8, 2014

Related U.S. Application Data

(60) Provisional application No. 61/722,364, filed on Nov. 5, 2012.

(51) Int. Cl.
*G06K 9/00* (2006.01)
*G06T 5/00* (2006.01)
*G06T 7/00* (2006.01)
*G01N 33/48* (2006.01)

(52) U.S. Cl.
CPC .......... *G06K 9/00147* (2013.01); *G06K 9/0014* (2013.01); *G06T 5/004* (2013.01); *G06T 7/0012* (2013.01); *G06T 7/0081* (2013.01); *G06T 7/0091* (2013.01); *G06T 2207/10056* (2013.01); *G06T 2207/10064* (2013.01); *G06T 2207/20141* (2013.01); *G06T 2207/20152* (2013.01); *G06T 2207/30024* (2013.01); *G06T 2207/30242* (2013.01)

(58) Field of Classification Search
CPC ............... G06K 9/00; G06T 5/00; G06T 7/00
USPC ......... 382/128, 129, 130, 131, 132, 133, 134; 128/920, 922; 702/19
See application file for complete search history.

(56) References Cited

U.S. PATENT DOCUMENTS 6,381,352 B1 * 4/2002 Nelson .......................... 382/132
6,466,689 B1 * 10/2002 MacMahon ................... 382/132
6,661,909 B2 * 12/2003 Youvan et al. ................ 382/132
7,979,212 B2    7/2011 Gholap et al.
2007/0238954 A1 * 10/2007 White et al. .................. 600/407

OTHER PUBLICATIONS

L. S. Whitman et al., "Improving human object recognition performance using video enhancement techniques," Optics and Photonics for Counterterrorism and Crime Fighting, Ed. Tim P. Donaldson, Proc. SPIE, vol. 5616 (2004) 93-102.

(Continued)

*Primary Examiner* — Abolfazl Tabatabai
(74) *Attorney, Agent, or Firm* — AFMC LO/JAZ; Chastity Whitaker

(57) ABSTRACT

A method of classifying, with a computer processor, at least one feature of cells from a low contrast, digital image. The method includes generating a contrast-enhanced image by applying a high-pass filter to the low contrast, digital image. The contrast-enhanced image is smoothed with a first low pass filter. A background image, generated from the low contrast, digital image, is subtracted from the smoothed, contrast-enhanced image to form an analysis image. The at least one feature is identified in analysis image.

19 Claims, 11 Drawing Sheets

(56) References Cited

OTHER PUBLICATIONS

M. Niethammer and S. Pizer, "Comp 775: Simple Segmentation Approaches," Powerpoint Presentation dated Sep. 15, 2010, 22 pages, available at http://wwwx.cs.unc.edu/~mn/classes/2010/comp775/simple_segmentation_methods.pdf, accessed Oct. 23, 2013.

* cited by examiner

SYSTEMS AND METHODS FOR PROCESSING LOW CONTRAST IMAGES

Pursuant to 37 C.F.R. §1.78(a)(4), this application claims the benefit of and priority to prior filed Provisional Application Ser. No. 61/722,364, filed Nov. 5, 2012, which is expressly incorporated herein by reference, in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to high-throughput screening of microscopic classification and, more particularly, to microscopy image processing techniques for high-throughput screening.

BACKGROUND OF THE INVENTION

Cell-based screening is a technology used for exploring normal cellular processes and modulation thereto caused by chemical, infection, and/or genetic changes. Screening has conventionally been a challenge as multiple aspects of experimental biology are performed, including, for example, the preparation of cells, automated microscopy, high throughput screening of large compound libraries, and the development of image analysis and pattern recognition linked to high level bioinformatics databases. These considerations have motivated the development of high content screening methods, which are based on the microscopy of modified host cells to show the activity or organization of molecular targets inside the living cells. Primarily, these techniques have been used for identifying drug candidates for a particular disease or exploring a functional aspect of a given subcellular molecule, including genes, effects of toxins, and material and environmental conditions using statistical analysis.

For example, FIGS. 1A and 1B illustrate monocyte-derived macrophages 10, 12 in a healthy condition (FIG. 1A) and an infected condition (FIG. 1B). Macrophages, along with monocytes, from which macrophages are produced, function in non-specific defense. Accordingly, macrophages are mobile, such as by amoeboid movements, by extending pseudopodia 14, 16 so as to engulf likely pathogens, for example, bacterium, by phagocytosis. The macrophage includes a cell membrane 18, 20, a nucleus 22, 24, and a plurality of organelles and cytoskeletal features (not shown) within the cytoplasm 26, 28. Phenotypic changes to the macrophage due to bacterial infection may include: cell size (the infected macrophage 12 is shown to be larger than the normal macrophage 10), cell shape (the infected macrophage 12 is shown to have more pronounced pseudopods 16 than the normal macrophage 10), multi-scale features, invariant moment features, statistical texture features at different scales, Laws texture features, differential features of the intensity surface (features of local gradient magnitude, local gradient orientation, Laplacian, isophote, flowline, brightness, shape index, etc.), frequency domain features, histogram features distribution features (radial, angular, etc., of intensity distribution, gradient magnitude distribution), local binary pattern image features, local contrast pattern image features, cell boundary features, edge features and other heuristic features, such as spottiness, Chi-square distance between histograms of pixel patches, between concentric circular areas within the cell, gray-class distance, and heuristic and problem specific features, to name a few.

Cellular features may be examined by way of microscope or microscopic imaging. For example, bright field microscopy images provide a quick and efficient method of detecting the cells and cellular features. Cellular detection, counting, and classification on bright field images may automated; however, images of cell populations tend to be low contrast images with uneven illumination, may contain objects with uneven textures, and may include debris and other artifacts, which makes automation difficult.

As a result, there remains a need for techniques that may, at least partially, automate bright field microscopy imaging, pre- and post processing of images, and screening of cell populations for investigating phenotypic changes due to chemicals, toxins, infection, genetic alteration, or environmental conditions.

SUMMARY OF THE INVENTION

The present invention overcomes the foregoing problems and other shortcomings, drawbacks, and challenges of conventional bright field microscopy image processing with screen of cell populations imaged therein. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a method of classifying, with a computer processor, at least one feature of cells from a low contrast, digital image. The method includes generating a contrast-enhanced image by applying a high-pass filter to the low contrast, digital image. The contrast-enhanced image is smoothed with a first low pass filter. A background image, generated from the low contrast, digital image, is subtracted from the smoothed, contrast-enhanced image to form an analysis image. The at least one feature is identified in analysis image.

According to another embodiment of the present invention, a method of mapping, with a computer processor, cells infected with fluorescent-emitting bacteria from a low contrast, digital image representing the infected cells includes detecting a boundary for each of the infected cells and distinguishing uninfected and infected cellular regions. A plurality of peak fluorescence intensities are detected within the infected cellular region and compared with an ideal bacteria fluorescence profile. At least one of the plurality of peak fluorescent intensities is identified as representing bacteria.

Still another embodiment of the present invention is directed to a plurality of cellular feature protocols. Each protocol of the plurality is configured to classify at least one phenotypic feature of an infected cell and includes an imaging protocol, an image processing protocol, and at least one model. The imaging protocol includes processor executable instructions for generating at least one low contrast, digital image representing the infected cell. The image processing protocol includes processor executable instructions for processing and enhancing the at least one low contrast, digital image. The at least one model is applied to the process and enhanced at least one low contrast, digital image and configured to return a classification of the at least one phenotypic feature.

In one aspect of the present invention, the at least one low contrast digital image is a non-fluorescent digital image. In another aspect of the present invention, the at least one low contrast digital image is a fluorescent digital image.

In accordance with yet another embodiment of the present invention, an image analysis system includes the plurality of cellular feature protocols and a calculating unit. Protocols of the plurality include processor executable instructions for processing and enhancing low contrast images representing cells, which are used for analyzing and classifying a feature of the imaged cells. The calculating unit, programmed with a computer program product, process and enhances the low contrast images according to the protocol selected form the plurality.

The above and other objects and advantages of the present invention shall be made apparent from the accompanying drawings and the descriptions thereof.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 11A-12 are exemplary images illustrating a method of detecting bacteria in using the method of FIG. 10.

DETAILED DESCRIPTION OF THE INVENTION

While those of ordinary skill in the art will readily appreciate the various applications to which the embodiments of the present invention may apply, for the purposes of explanation and illustration herein, embodiments of the present invention are described with respect to the investigation of features and classification of macrophages. Furthermore, use of the present invention should not be limited to the illustrative embodiments provided herein.

Figure 1A:
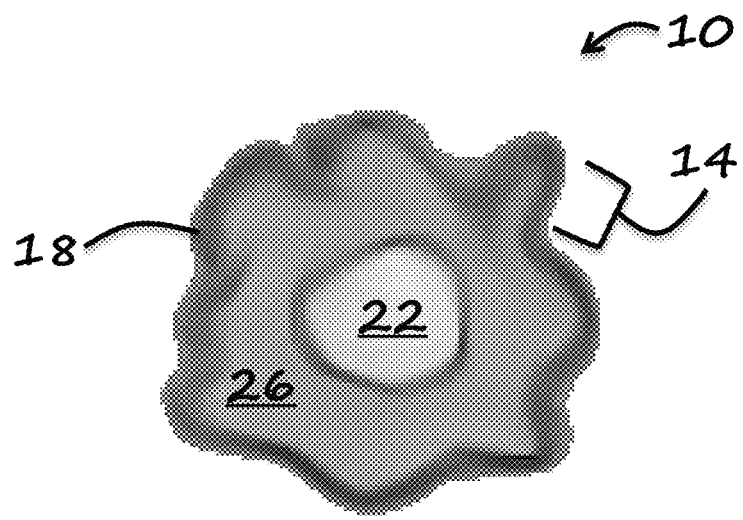
FIG. 1A is a schematic illustration of a normal monocyte-derived macrophage.
Figure 1B:
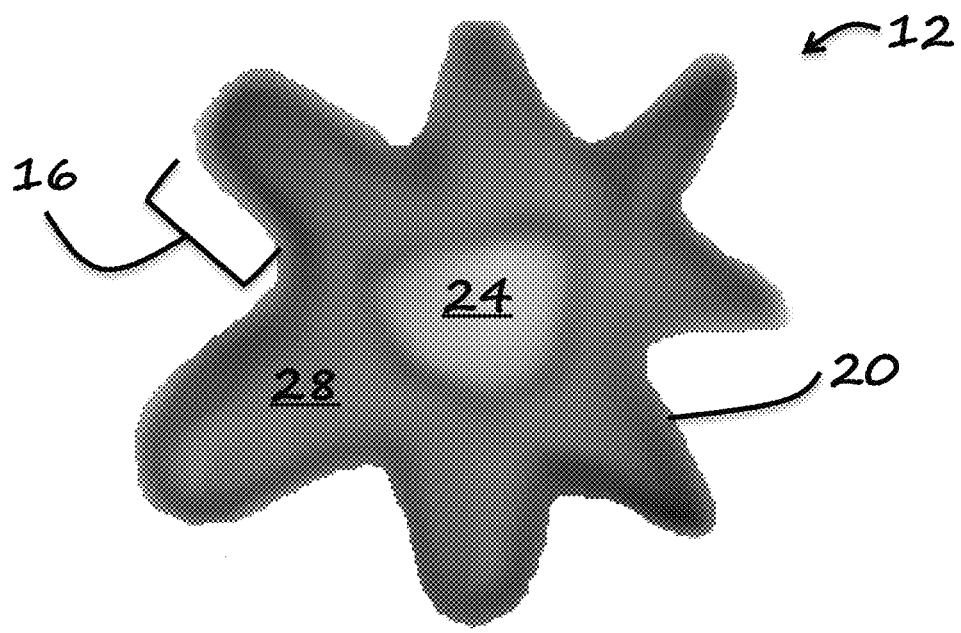
FIG. 1B is a schematic illustration of an infected monocyte-derived macrophage having phenotypic changes.
Figure 2:
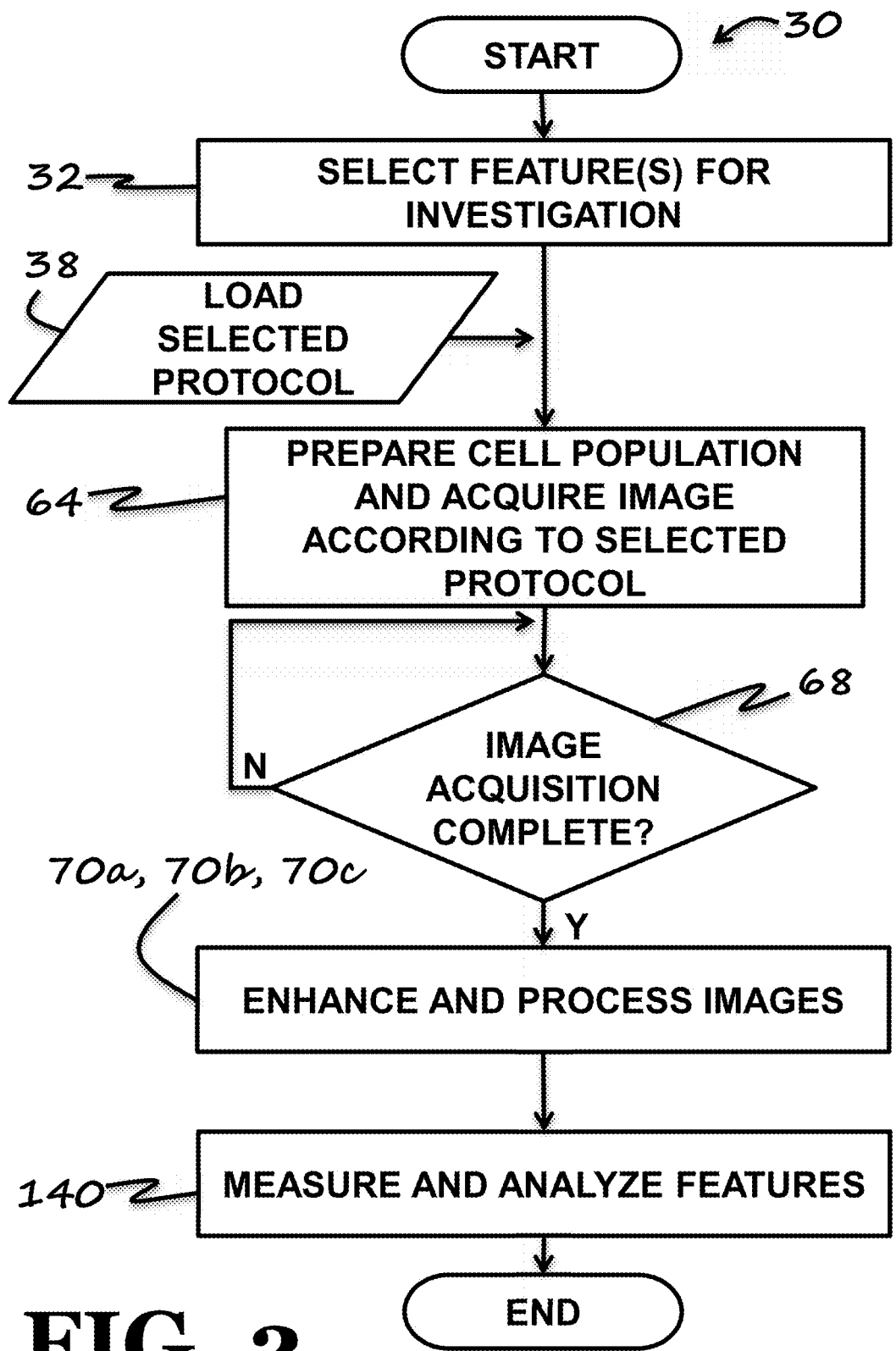
FIG. 2 is a flowchart illustrating a method of screening features of cell images in accordance with one embodiment of the present invention.
Figure 3:
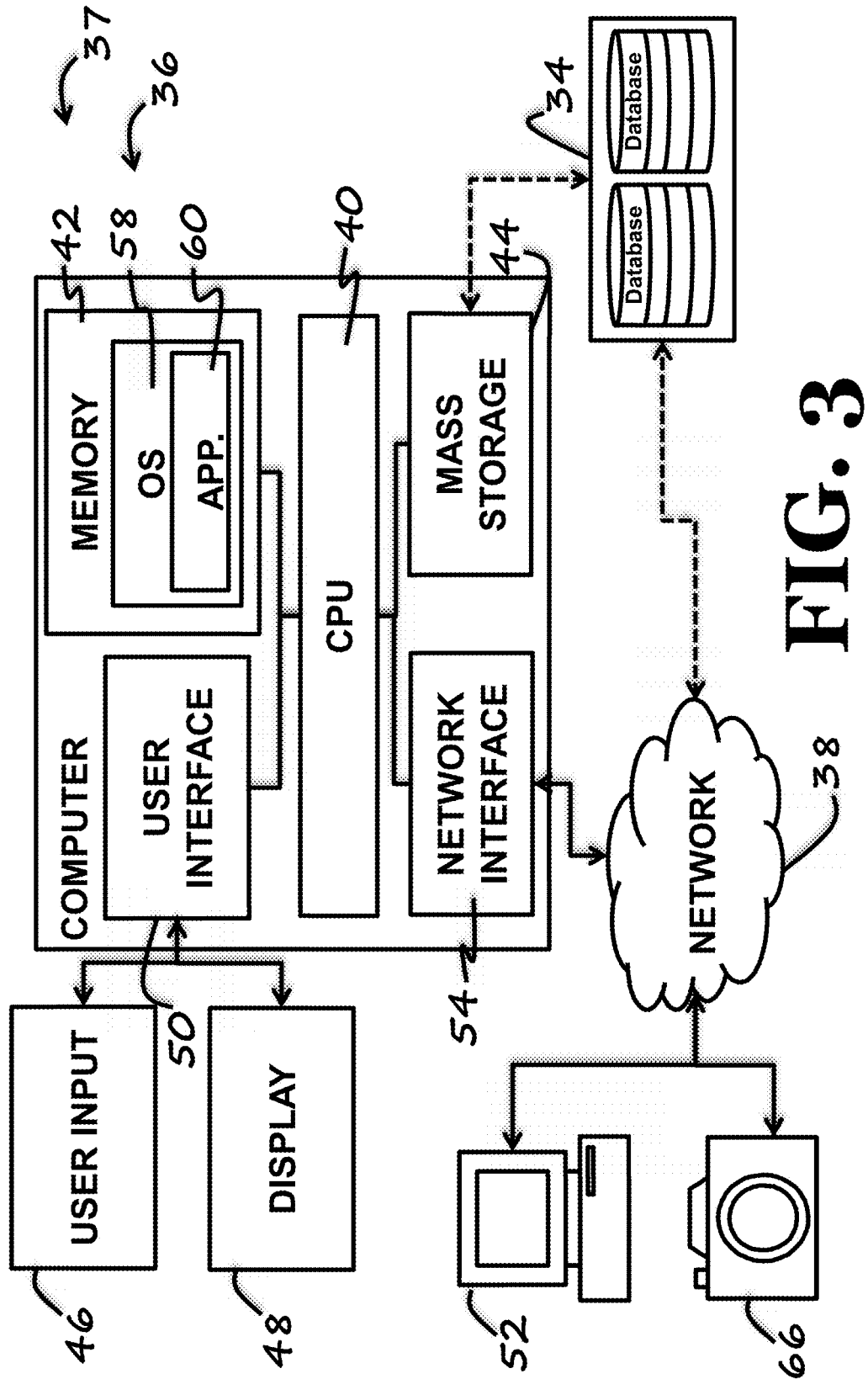
FIG. 3 is a schematic illustration of a computer for processing and enhancing the cell images according with one embodiment of the present invention.

Turning now to FIG. 2, a flowchart 30 illustrative a method of screening features of macrophages in accordance with one embodiment of the present invention is shown. In Block 32, a macrophage population is prepared and a particular feature for investigation is selected. However, it will be appreciated by the skilled artisan that more than one feature may be investigated. Based on the selection of feature, a protocol having instructions, algorithms, and so forth that are appropriate for the selected feature may be loaded from database 34 or libraries onto a computer 36 (Data Block 38). FIG. 3 illustrates an exemplary hardware and software environment for an apparatus suitable for performing queries in a manner consistent with the present invention. For the purposes of the present invention, the illustrative apparatus may represent practically any computer, computer system, or programmable device, e.g., multi-user or single-user computers, desktop computers, portable computers and devices, handheld devices, network devices, mobile phones, etc. The apparatus will hereinafter be referred to as the "computer 36" although it should be appreciated that the term "apparatus" may also include other suitable programmable electronic devices.

Furthermore, it would be readily appreciated that the computer 36 may be incorporated into a separate image analysis system 37 or into an imaging system and may communicate via a network 38 as described in detail below.

The computer typically includes at least one processor 40 coupled to a memory 42. The processor 40 may represent one or more processors (e.g. microprocessors), and the memory 42 may represent the random access memory (RAM) devices comprising the main storage of the computer 36, as well as any supplemental levels of memory, e.g., cache memories, non-volatile or backup memories (e.g. programmable or flash memories), read-only memories, etc. In addition, the memory 42 may be considered to include memory storage physically located elsewhere in computer, e.g., any cache memory in a processor, as well as any storage capacity used as a virtual memory, e.g., as stored on a mass storage device or another computer coupled to computer via a network. An associated mass storage device 44 may contain a cache or other dataspace, which may include the databases 34.

The computer 36 also typically receives a number of inputs and outputs for communicating information externally. For interfacing with a user or operator, the computer 36 may include includes one or more user input devices 46 (e.g., a keyboard, a mouse, a trackball, a joystick, a touchpad, a keypad, a stylus, and/or a microphone, among others). The computer 36 may also include a display 48 (e.g., a CRT monitor, an LCD display panel, and/or a speaker, among others). The interface 50 to the computer 36 may also be through an external terminal connected directly or remotely to the computer, or through another computer 52 that communicates with the computer 36 via a network interface 54 and associated network 38, modem, or other type of communications device.

The computer 36 operates under the control of an operating system 58, and executes or otherwise relies upon various computer software applications 60, components, programs, objects, modules, data structures, etc. (e.g. query optimizer and query engine).

In general, the routines executed to implement the embodiments of the present invention, whether implemented as part of an operating system or a specific application 60, component, program, object, module or sequence of instructions will be referred to herein as "computer program code," or simply "program code." The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 3 is not intended to limit the present invention. Indeed, those skilled in the art will recognize that other alternative hardware and/or software environments may be used without departing from the scope of the invention.

Continuing with the method of feature analysis as provided in FIG. 2, if necessary and in accordance with the selected protocol set for the feature(s) to be investigated, the cell population may be prepared and imaged according to instructions set forth in the selected protocol (Block 64). Accordingly, the selected protocol may include one or more staining methods, imaging methods, and processing methods to provide specific information related to the selected feature for investigation. For example, staining methods, if necessary, may include CellTrace™ BODIPY® (Molecular Probes, Inc., Eugene, Oreg.), which enters and remains localized in the membranes of intracellular organelles, such as endoplasmic reticulum, Golgi apparatii, and mitochondria; Cell-Trace™ Deep Red Stain (Molecular Probes, Inc.) contains lipophilic and hydrophilic components, which are retained within the plasma membrane; CellTrace™ Hoescht (Molecular Probes, Inc.) permeate the nuclear membrane and emits blue fluorescence when bound to double-strand DNA; and BODIPY® 650/665 Phalloidin is a fluorescently water-soluble labeled phallotoxin that stains F-actin with near-infrared fluorescence. However, it would be readily understood that staining may not be necessary in all protocols. Furthermore, cell population preparation need not be limited to staining, but could also include material loading to include nanomaterials.

One or more images may then be acquired of the prepared cell population by an imaging system 66 (FIG. 3). One suitable imaging modality, bright-field microscopy, is an optical microscopy illumination technique in which the cells comprising the population are illuminated. Resultantly, the image includes representations of cells as dark objects on a bright background. While imaging may be accomplished with any number of imaging system, one particularly sufficient method includes an OPERA® confocal high-content imaging system (Perkin Elmer, Waltham, Mass.). The acquired images may be phase-contrast, amplitude-contrast, or other modality as would be appreciated by those of ordinary skill in the art.

The number and type of images acquired depends, at least in part, on the feature(s) to be analyzed and the selected protocol. In following the exemplary method illustrated in FIGS. 2 and 4-12, cells stained with BODIPY®, Deep Red Stain, and Hoescht stain are imaged with three-channels (one channel per stain) by three cameras, preregistered using fluorescent bead plates. Accordingly, a first channel images the Hoescht-stained nuclei, a second channel images Deep Red-stained cell membranes and organelles, and a third channel images green fluorescent protein ("GFP")-labeled bacteria. Again the number of channels and images acquired may largely depend on the number of features to be investigated, the compatibility and combinability of the selected protocols, user preferences, and limitations imposed by instrumentation and equipment.

When image acquisition is complete ("Yes" branch of decision block 68), the acquired images may be enhanced and processed in accordance with methods described in detail below with reference to FIGS. 4-12. Otherwise ("No" branch of decision blow 68), image acquisition continues until completion.

The acquired images may be transferred from the imaging system 66 to the computer 36 of the image processing system 37. One such transfer may occur via the network interface 54; alternatively, the computer 36 and/or image processing system 37 may be incorporated into and comprise a portion of, the imaging system 66. In either event, the computer 36 executes one or more program codes, according to the selected protocol, to enhance and/or otherwise process the acquired images according to embodiments of the present invention (Block 70a, 70b, 70c).

Figure 4:
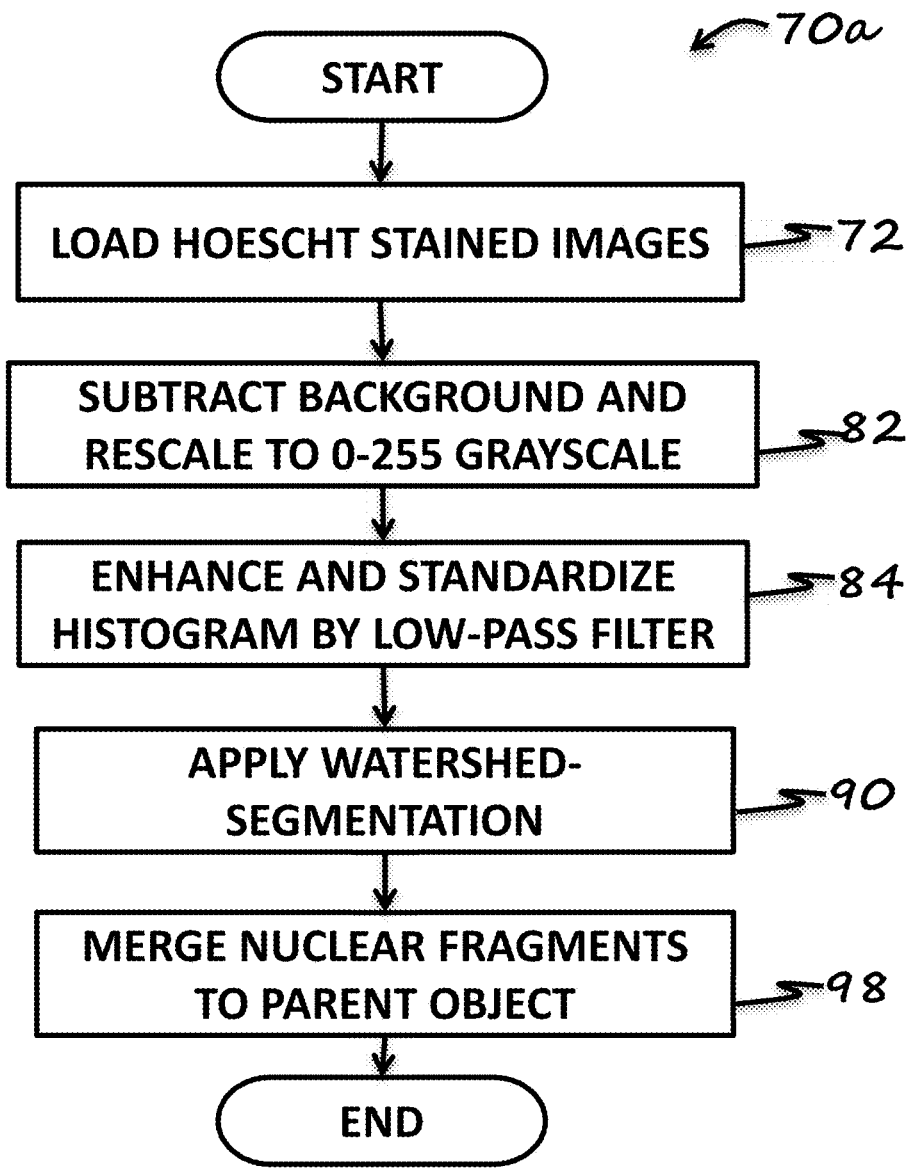
FIG. 4 is a flowchart illustrating a method of processing and enhancing the cell images in accordance with one embodiment of the present invention.
Figure 5:
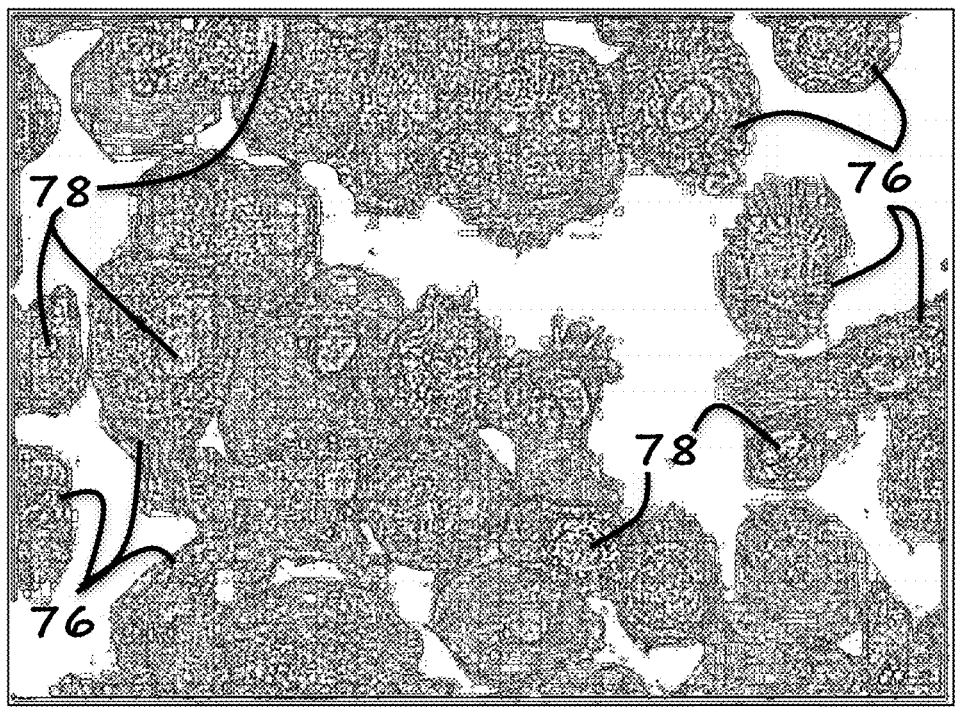
FIG. 5 is an exemplary image of Hoescht-stained cells and acquired using bright field microscopy.
Figure 6:
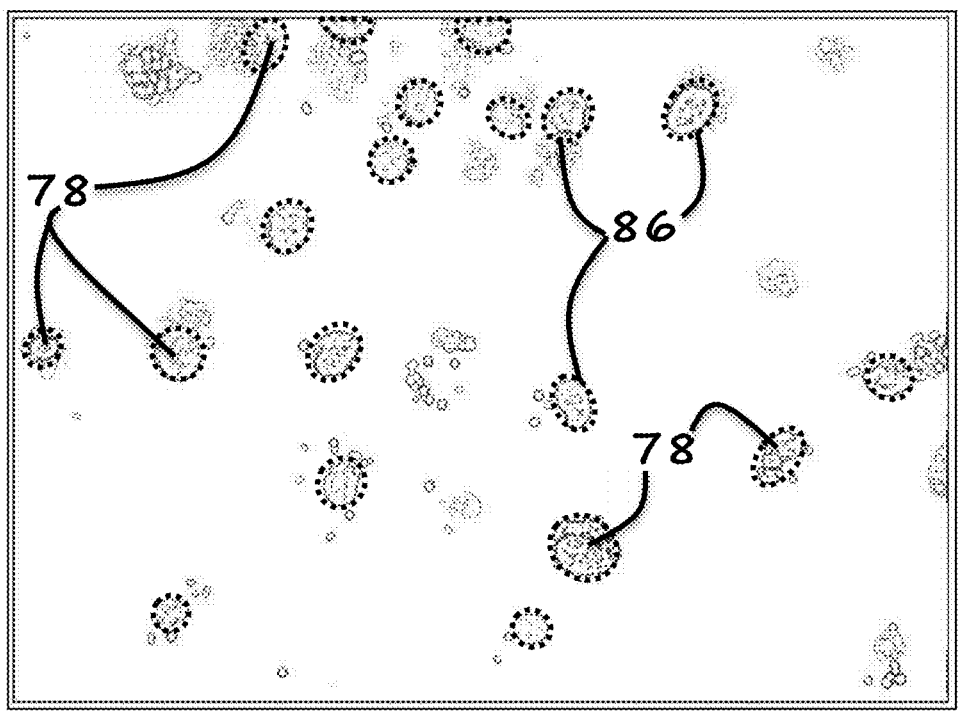
FIG. 6 is a processed image derived from the image of FIG. 5 and showing detected nuclei and using the method of FIG. 4.
Figures 7A, 7B:
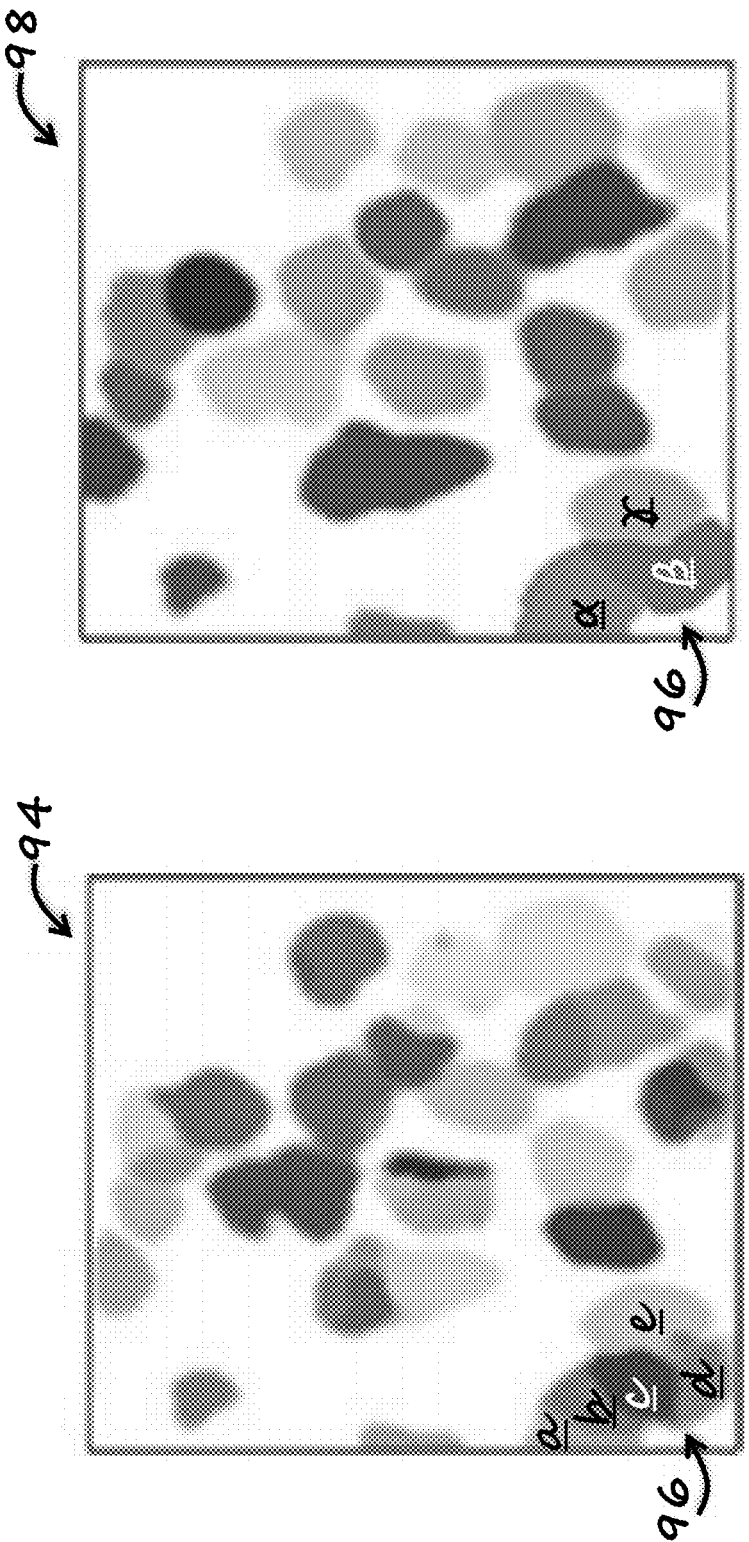
FIGS. 7A and 7B are exemplary images illustrating a method of merging nuclear fragments in accordance with one embodiment of the present invention.
Figure 8:
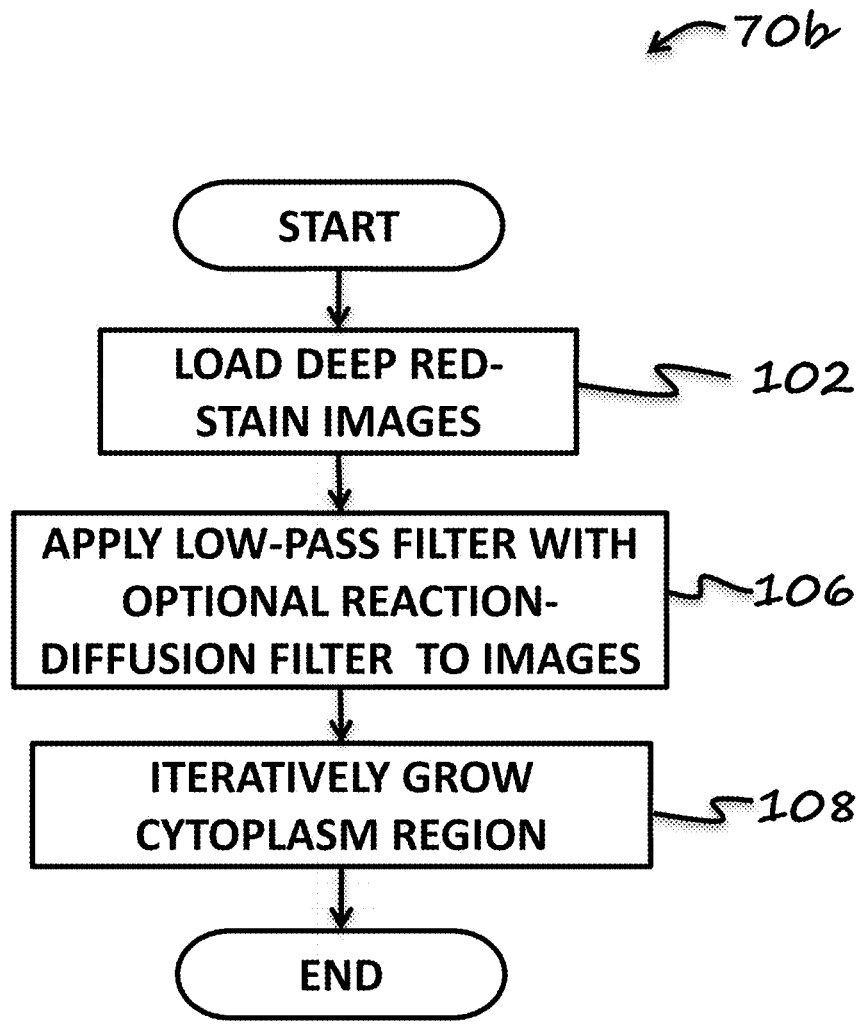
FIG. 8 is a flowchart illustrating a method of processing and enhancing the cell images in accordance with another embodiment of the present invention.

With reference now to FIG. 4, a flowchart 70a illustrates one method of processing images according to one embodiment of the present invention. In Block 72, Hoescht-stained images are loaded into the memory 42 (FIG. 3) of the computer 36 (FIG. 3) for processing. FIG. 5 illustrates an exemplary Hoeschet-stained image (not shown) and represents a plurality of macrophage cells 76, the nuclei 78 of some being visible, on a white background 80.

In Block 82, the background 80 of the loaded image is subtracted and the nuclei image is rescaled to 0-255 grayscale. The grayscale is then enhanced by standardizing the histogram, which enhances the brightness of objects within the image. One exemplary method of standardizing the grayscale, as provided in Block 84, includes smoothing the histogram by applying a Gaussian filter (σ=21, selected from experiments with smaller subsets of data) to provide a smooth image, $I_{eq}$, having a nuclear image contrast defined by:

$$I_{contrast} = \frac{(I \cdot I_{eq}) - \min(I \cdot I_{eq})}{\max(I \cdot I_{eq}) - \min(I \cdot I_{eq})} \times \max(I)$$

where I is the input image, $I_{eq}$ is the histogram equalized image, and $I_{contrast}$ is the nonlinear contrast enhanced image 74 (FIG. 5), also referred to as the background image.

Because macrophages 76 (FIG. 5) tend to cluster and because the image 74 has a finite thickness throughout which a plurality of macrophages 76 may, at least partially, overlap, each segment of the nuclear mask 86 may contain one or more nuclei, or in other words, is a nuclear cluster 88 (FIG. 7). In that regard, and in accordance with Block 90, nuclear clusters 88 may be segmented using a watershed-like region-growing algorithm. Examples of a watershed-like region growing algorithm in described in U. ADIGA and B. B. Chaudhuri, "An efficient method based on watershed and rule-based merging for segmentation of 3-D histo-pathological images," *Pattern Recog.* Vol. 34 (2001) 1449-1458, and U. ADIGA et al., "High-throughput analysis of multispectral images of breast cancer tissue," *IEEE Trans. Imag. Process.*, Vol. 15 (2006) 2259-2269, the disclosures of which are incorporated herein by reference, in their entireties.

According to one embodiment of the present invention, the image 92 undergoes the watershed region-growing algorithm. Briefly, watershed based-algorithms evaluates those regions in which pixel intensity decreases from locii of maximal gradient magnitude given by:

$$g(x, y) = \sqrt{(I(x-1, y) - I(x+1, y))^2 + (I(x, y-1) + I(x, y+1))^2}$$

wherein g(x,y) is the discrete gradient magnitude map of the image, I(x,y).

Locii define boundaries between background and foreground pixels of which the foreground pixels representing cellular nuclei 78. Therefore, the locii boundary may be used for creating a global nuclear mask (illustrated as dotted circles 86 in FIG. 6). Background pixels, e.g., those not representing cellular nuclei 78, are clipped and image intensity may be rescaled to 0-255 grayscale.

Noisy peaks near the nuclear mask 86, which may be due to less than perfect convex surface of the measured nucleus, may result in fragmentation. For example, and with the nuclear mask image 94 shown in to FIG. 7A, shading of a cluster 96 appears to comprise five fragments (indicated with reference symbols a, b, c, d, e) that, in reality, represent three nuclei (indicated with reference symbols, α, β, γ) shown the processed image 98 of FIG. 7B.

In Block 100, the nuclear fragments a, b, c, d, e are detected and merged, as appropriate. One method of detection and merger includes detecting the depth of a first fragment a as the maximum distance value within the detected fragments a, b, c, d, e. Presuming, arguendo, the average nucleus depth is r pixel units based on the distance map, then those fragments a, b, c, d, e whose depth value is less than r/4 pixels are considered to be fragments of the nucleus.

For each detected fragment a, b, c, d, e, all possible parental cell nuclei 78 (FIG. 5) (touching or adjacent neighboring nuclei 78 (FIG. 5) that are not fragments themselves) are identified. The fragment a, b, c, d, e that is merged with the parental nucleus 78 (FIG. 5) has the longest shared boundary with the corresponding fragment a, b, c, d, e.

Detection and labeling of an image with a nuclear mask 86, such as described in the instant embodiment of the present invention, enables evaluation of nuclear features, such as size and shape of the nucleus or bacterial infection of the nucleus, a method of which is described in greater detail below.

With the Hoescht-stained image processing complete, the near- and far-red dyed images may be processed for cell cytoplasm segmentation. That is, while a cell's nucleus may be generally considered to be centrally-located within the cell, this position is neither constant nor absolute. In that regard, and with reference to FIG. 8, a flowchart 70b illustrating a method of processing images in accordance with another embodiment of the present invention is explained as the exemplary processing of images of Deep Red-stained populations.

In Block 102, Deep Red-stain images (example image 104 shown in FIG. 9A with nuclear masks 86 layered thereon) are loaded into the memory 42 (FIG. 3) of the computer 36 (FIG. 3) for processing. A low-pass filter is applied (Block 106), which may include smoothing and down-sampling the images 104. A reaction-diffusion filter may also be applied, for example, a normalized reaction diffusion filter:

$$\frac{\partial I}{\partial t} = \cos\beta \cdot \nabla h \cdot \nabla I + \sin\beta \cdot h \cdot \nabla^2 I$$

where I(x,y,t) is the image intensity, h is the edge-indicator function, and the parameter β is selected to balance the reaction and diffusion components of the filter.

In Block 108, a region growing process is applied to mark cell cytoplasm of separate and discrete macrophage cells 76. One exemplary process includes selecting one or more cell markers (illustrated as dots 110), i.e., pixels known to represent cytoplasm of the cells 76. For every cell marker 110, a set of unmarked foreground pixels in the circular region outside the cell marker 110 is considered a potential pixel candidate for further region growth. The pixel intensity of the potential pixel candidate is compared to the pixel intensity of the corresponding cell marker 110. If the pixel intensity of the potential pixel candidate is similar to the pixel intensity of the cell marker 110, then the potential pixel candidate is considered to represent cytoplasm of the instant cell 76 and the iterations continue. Similarity of pixel intensities may be evaluated by μ−(1·σ), where μ is the average intensity of the corresponding cell marker 110, and σ is the standard deviation of the pixel intensities of the cell marker 110. Iterations continue until an evaluated potential pixel candidate is to determine to represent a cellular membrane, i.e., having an intensity not sufficiently similar to the intensity of the cell marker 110. Cell membrane detecting may include a Canny edge detector that uses multi-stage algorithms to detect edges in digital images; however, the skilled artisan will readily appreciate that other edge detection methods may also or alternatively be used.

In a next iteration, a new region consisting of a one-pixel thickness around the cell marker 110 is considered for region growing in the manner described above. The iteration ends when all the pixels in the corresponding region are background pixels or do not pass the criteria provided above. While the number of iterations may vary, a first approximation, based on experimentally measured, general cell size, may be used to limit computational time. Further reduction in computational time, and in errors, generally, may include eliminating those cells that do not conform to a regular shape and/or size during cell classification.

Figure 9A:
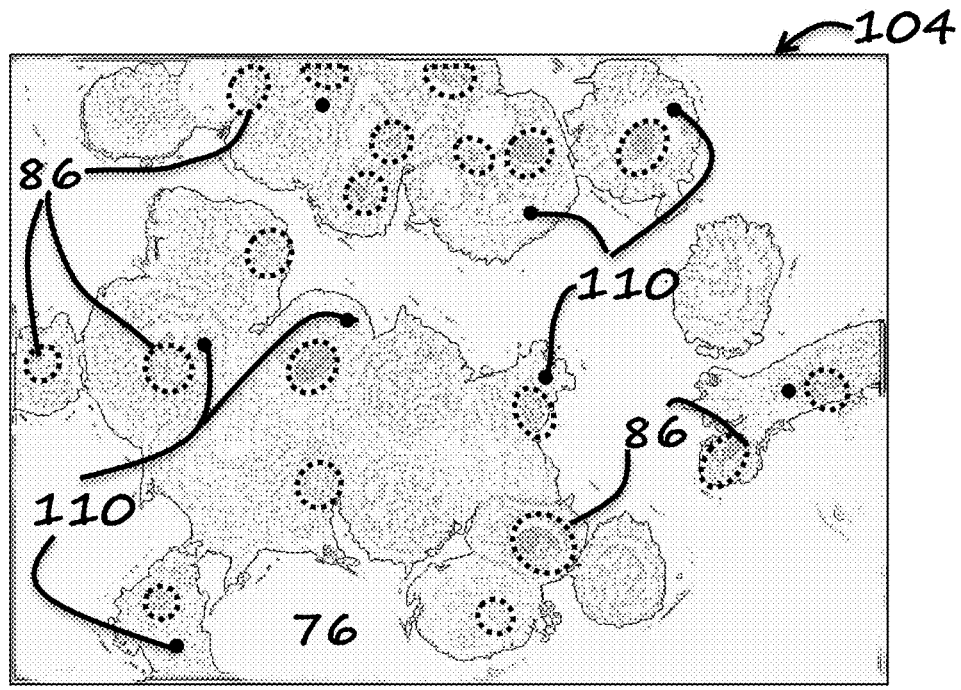
FIGS. 9A and 9B are exemplary images illustrating a method of detecting cytoplasm by a region-growth algorithm and the method of FIG. 8.
Figure 9B:
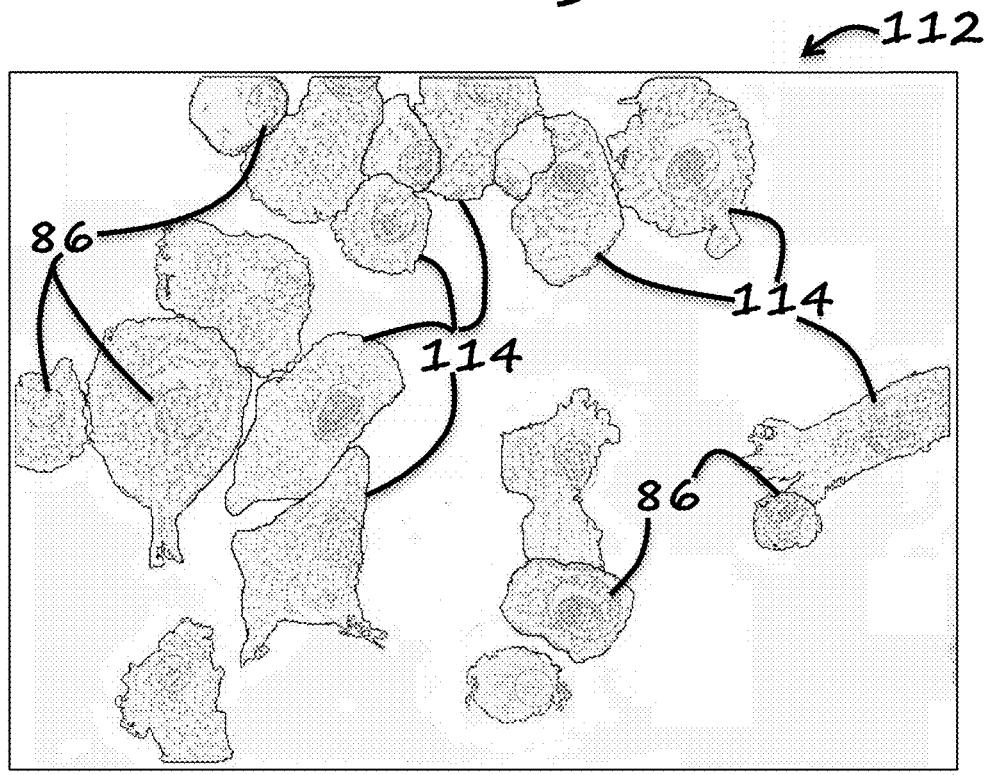

The resulting image 112, shown in FIG. 9B, delineates each cell 76 as determined by the edge detection process by a cytoplasm mask 114, which is layered over the image 112. The nuclear mask 86 may be included, as shown, and if desired.

Figure 10:
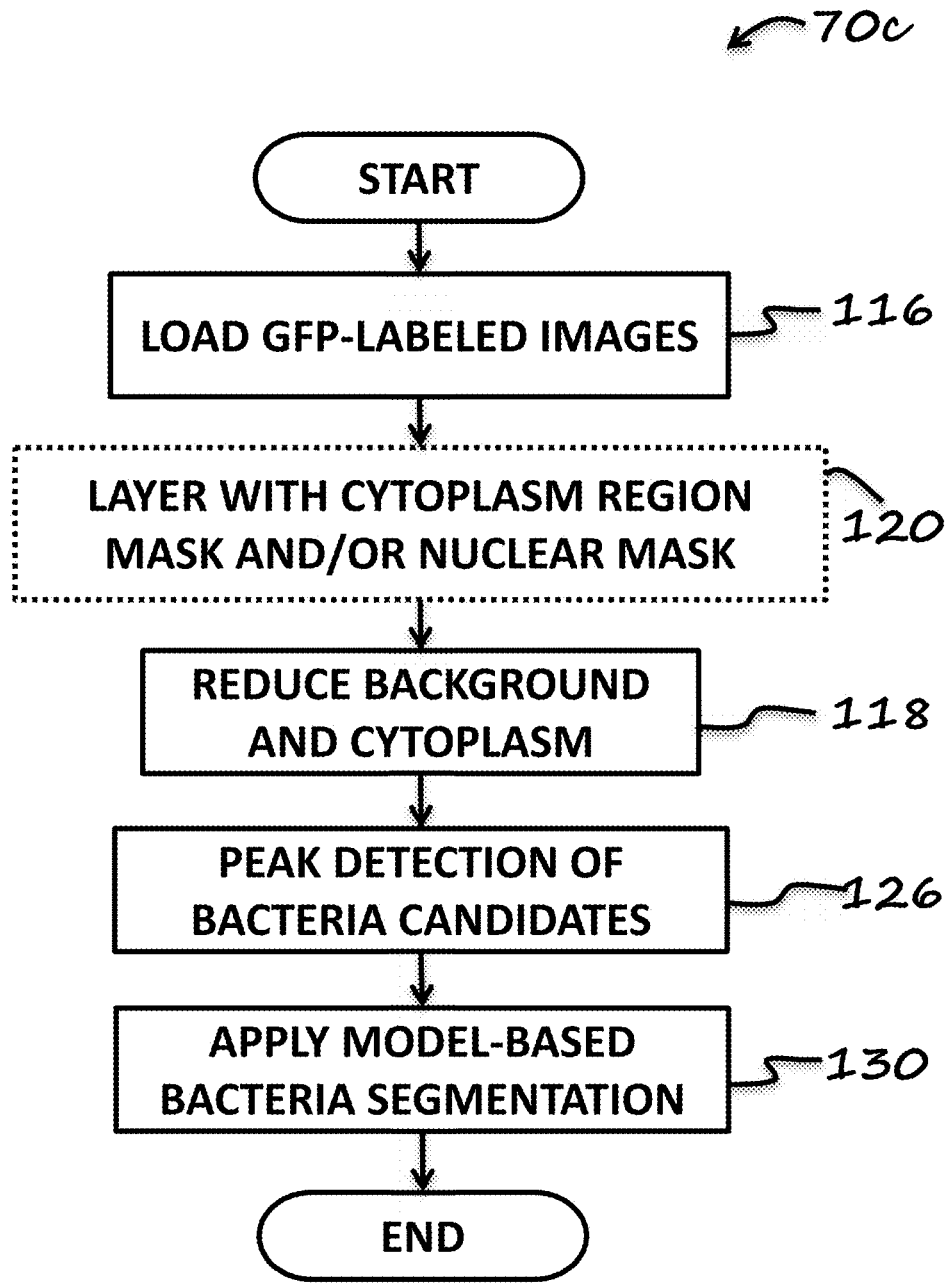
FIG. 10 is a flowchart illustrating a method of processing and enhancing the cell images in accordance with still another embodiment of the present invention.

Turning now to FIG. 10, images of the GFP-stained population are loaded in Block 116 of flowchart 70c for processing and evaluating bacteria populations and/or level of infection. Bacteria detection (such as, *Francisella tularenesis* (Ft)) is complicated by the fact that bacterial cells are smaller in size as compared to the host cell and may, depending of the imaging protocol, be less than one pixel in size. Therefore, selected protocols in which the feature under evaluation includes bacteria detection may include fluorescent-type images, such as GFP, to capture images representing the fluorescent emissions from the bacteria.

Because the Ft bacteria infect the DNA of host cells, localization of Ft bacteria may be limited to within the nucleus of the host cells. In that regard, and in reference to Block 118, pixels representing background as well as cytoplasm are suppressed or reduced by a low-pass filter (such as a roll-ball filter having a radius of about 5). The cytoplasm mask 114 (FIG. 9B) and the nuclear mask 86 (FIG. 6) may be layered onto the loaded image for segregating background, cytoplasm, and nuclei, as provided in optional Block 120. An exemplary smoothed image 122 of the nucleus 78 of a single macrophage cell is shown in FIG. 11A and includes a plurality of high-intensity regions 124 corresponding to bacteria populations within the nucleus 78.

Figures 11A, 11B, 11C:
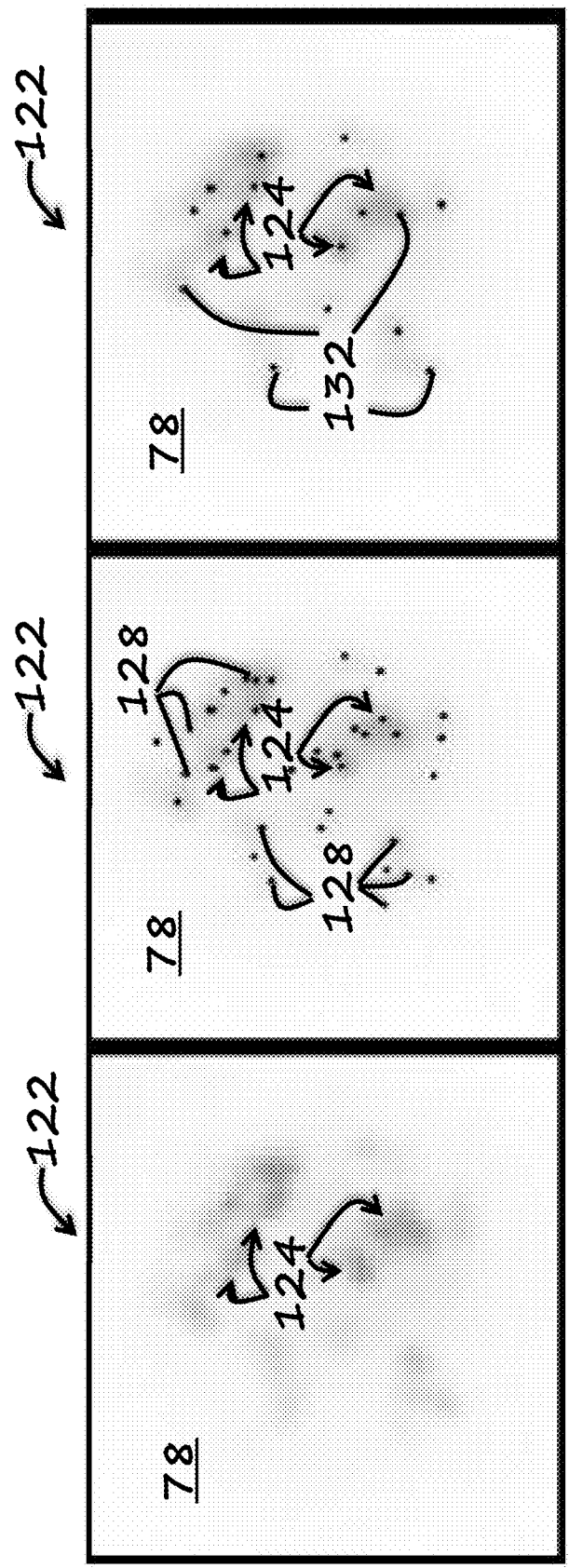

Intensity peaks within each of the plurality of high-intensity regions 124 may be flagged as potential Ft candidates (Block 126) and are indicated in FIG. 11B as dots 128. In Block 130, potential Ft candidates 128 may then be fit to an ideal bacteria profile, for example, a symmetric or asymmetric Gaussian profile) with the mean intensity and variance defined by a small set of manually selected bacteria images. Elliptical regression may be completed with potential Ft candidate 128 being weighed according to the associated pixel intensity, which results in two-dimensional intensity profile projected onto a major axis. An L2 norm may be generated between the calculated two-dimensional intensity profile and an idea intensity profile. If the L2 norm indicates a sufficient match between the generated and calculated intensity profiles, then the potential Ft candidate 128 is considered to include an Ft signature and is marked as an Ft culture 132; otherwise, the potential Ft candidate does not qualify and is disregarded. FIG. 11C illustrates the reduced number of Ft cultures 132 as compared to the number of potential Ft candidates 128 of FIG. 11B.

It will be appreciated that the model applied to the processed and enhanced images may depend on the selected algorithm and may be specific to the particular feature investigated or the types of cells infected, or the algorithm may be customized according to the artisan's preference and understanding of the cell population.

Figure 12:
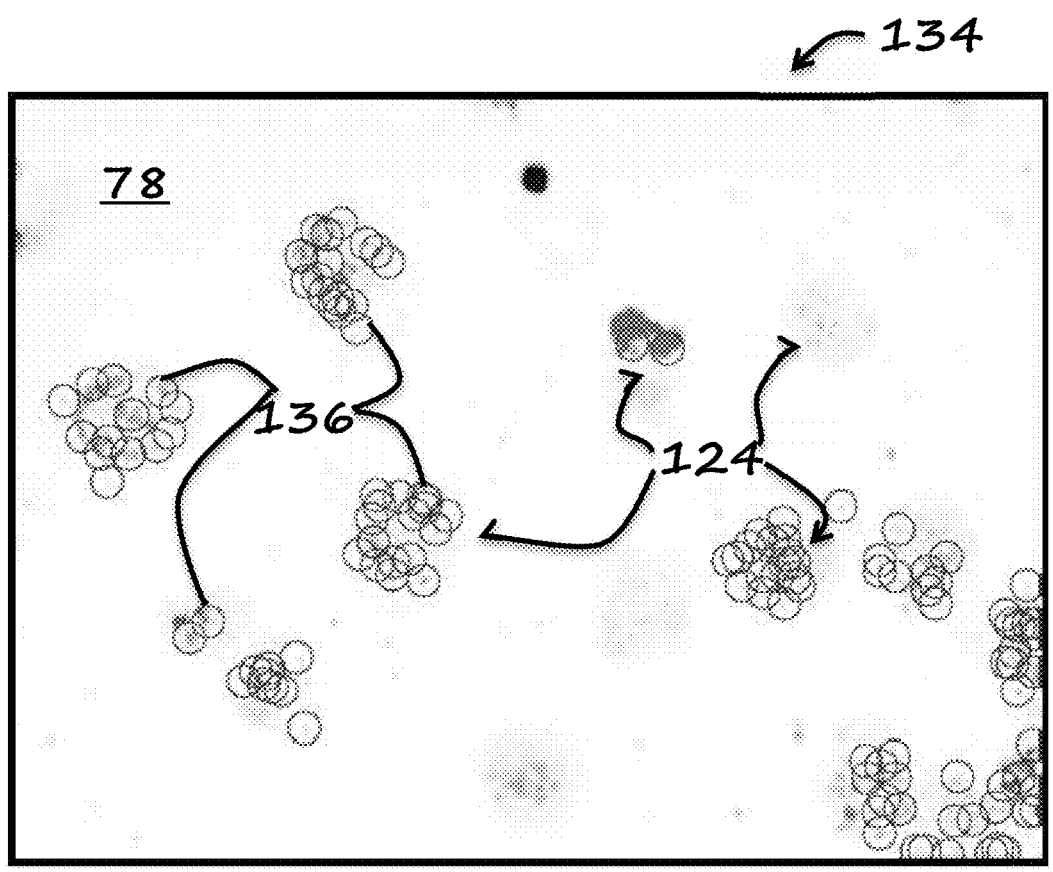

FIG. 12 illustrates an image 134 with Ft cultures 132 identified by circles 136. Pixels having similar profile but unmarked by circles 136 were not identified as Ft cultures 132 because of being located outside an accepted cell region or not conforming the to the particular applied, ideal bacteria profile. Use of the image 134 enables the skilled artisan to evaluate degree of bacterial infection.

With image processing and enhancement complete (Block 70a, 70b, 70c of FIG. 2), the features may be measured and analyzed (Block 140, FIG. 2) according to the selected protocol. For example, feature descriptors for classification of subcellular locations may be in accordance with R. F. MURPHY et al., "Robust numerical features for description and classification of subcellular location patterns in fluorescence in microscope images," J. VLSI Sig. Proc. Vol. 35 (2003) 311-321, and/or C. CONRAD et al., "Automatic identification of subcellular phenotypes on human cell arrays," Genome Res., Vol. 14 (2004) 1130-1136; features of normal cells may be normalized using the method described in A. K. Jain and R. C. Dubes, *Algorithms for Clustering Data*, Englewood Cliffs, N.J.: Prentice-Hall (1988); visual evaluation and/or counting; or other methods may be used as would be understood by those of ordinary skill in the art.

The following examples and comparative example illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example

Negatively selected, aphaeresized CD14 positive monocytes were purchased from Biological Specialty Corporation (Colmar, Pa.). For plating, cells were thawed quickly, at 37° C., and washed in complete media (RPMI medium containing 10% heat-inactivated fetal bovine serum, 2.7 ng/mL GM-CSF, 0.66 ng/mL M-CSF, and 2 mM L-glutamate). Cell density was adjusted to $7 \times 10^5$ cells/mL, and 50 µL of cell suspension (35000 cells) was added to each well of a 384 well carrier plate (Perkin Elmer). Plated cells were incubated at 37° C. in humidified atmosphere with 5% $CO_2$ for 24 hrs. Typical monocyte adherence was 25% to 30%. Media was replaced at 24 hrs and 96 hrs post plating. Cells were differentiated for a total of seven days, resulting in monocyte-derived macrophages ("MDMs").

Ft LVS Δblab::GFP was grown on chocolate agar at 37° C. for 60 hrs to 72 hrs. Bacterial colonies were suspended in phosphate buffered saline ("PBS"), and the concentration of the culture was estimated by measuring the $OD_{600}$ and comparing to an optical density cfu/mL relationship previously established. The bacteria were diluted in PBS to a concentration sufficient to deliver the intended multiplicity of infection of 100. The concentration of the suspension was confirmed by standard dilution and plate count methods. MDMs were infected every 2 hrs by adding bacteria and incubating at 37° C. and 5% $CO_2$ for 30 min. The cells were then washed three-times with PBS to remove the unincorporated bacteria. Infected cells were incubated at 37° C. and 5% $CO_2$ until fixation and staining. The infection protocol used provides a heterogeneous population of infected (30% to 40%) and uninfected cells. GFP-labeled Ft allows the identification of infected cells as well as the number of bacteria per cell as an indicated of the stage of infection (early versus late) for cross-referencing purposes.

Cells were washed once in Hank's Balanced Salt Solution ("HBSS"; Thermo Scientific HyClone, Logan, Utah) then incubated in 4% paraformaldehyde ("PFA"; Fisher Chemical, Fairlawn, N.J.) in HBSS for 30 min. at 37° C. After fixation, the cells were washed once in HBSS and stained with final concentrations of 1 µM cell trace BODIPY TR methyl ester (INVITROGEN, Life Technologies, Corp., Grand Island, N.Y.), 0.25 µg/mL cell mask deed red (INVITROGEN), and 1 µM final Hoescht (Sigma Chemicals, Perth, Wash.) in HBSS. MDMs were stained for 30 min. at 37° C. in humidified atmosphere with 5% $CO_2$. After staining, the cells were washed in HBSS and incubated in 1% bovine serum albumin in PBS (Thermo Fisher Scientific, Waltham, Mass.) for 20 min. at room temperature or 37° C. Cells were washed and stained with 165 nM BODIPY 650/665 phalloidin (INVITROGEN) in PBS with 1% BSA for 30 min. at room temperature or 37° C. Cells were washed again and 50 µL of PBS containing 1 µM Hoescht was added to each well.

Image acquisition was completed using an Opera confocal high-content imaging system (Perkin Elmer). To maximize the number of cells analyzed as well as to work within the limitations of the imaging system, two-dimensional images were acquired. The data were collected in three channels (one for each stain) using three cameras that were preregistered using fluorescent bead plates.

Images were acquired using a 40× water objective with a camera binning factor of 2, which provides an improved signal-to-noise ratio. With a numerical aperture of 0.9, image thickness was approximately 1 µm, and in-plane resolution was approximately 480×680, with each pixel represented by 12 bits. The exact image size varied from plate-to-plate as the cameras were reregistered with the bead plates after each imaging experiment.

All images were automatically corrected for poor lens effect.

Generally, images of about 1000 cells per well, and of control cells, were acquired. Data was collected every 2 hrs over a 72 hrs period.

Acquired images were processed in accordance with embodiments of the present invention and, in particular, according to FIG. 2.

The count of nuclei segmented were found to be generally accurate and in the range of 98% to 99%, as shown in Table 2:

TABLE 2

| Image Index | True Count | # objects prior to defrag. | % error | # objects after defrag | % error |
|---|---|---|---|---|---|
| 1 | 31 | 34 | 9.67 | 30 | 3.22 |
| 2 | 27 | 31 | 14.81 | 27 | 0.00 |
| 3 | 48 | 51 | 6.25 | 46 | 4.16 |
| 4 | 18 | 21 | 16.66 | 19 | 5.55 |
| 5 | 22 | 21 | 4.54 | 21 | 4.54 |
| Total (100 images) | 2936 | 3177 | 8.20 | 2972 | 1.22 |

Cell segmentation accuracy, as determined from a few features directed measured form masked image defining the cell phenotype, is shown in Table 3:

TABLE 3

| Cell Index | Actual Area | Measured Area | % error | % Area Symmetric Diff. | Standard Deviation |
|---|---|---|---|---|---|
| 1 | 3011 | 2716 | 9.79 | 15.27 | 136 |
| 2 | 2176 | 2332 | 7.17 | 10.41 | 71 |
| 3 | 7543 | 6774 | 10.19 | 18.56 | 231 |
| 4 | 5675 | 5012 | 11.68 | 19.71 | 228 |
| Mean (100 cells) | 4298 | 3837 | 10.72 | 15.08 | 156 |

The percentage area of the symmetric difference between manual and automatic segmentation is used for accuracy analysis. If A1 is the set of all pixels in the cell segmented by method 1 (for example, the manual segmentation) and $A_2$ is the set of pixels in the cell segmented by method 2 (for example, automatic segmentation), then the percentage of symmetric difference is given by:

$$100 \times \frac{(\{A_1 \cup A_2\} \backslash \{A_1 \cup A_2\})}{\#A_2}$$

where, $\cup$ is the set union operator, $\cap$ is the set intersection operator, $\#A_2$ is the number of pixels in set $A_2$, and \ is the set difference operator. While the general accuracy was around 85%, the actual influence of the error on feature analysis is further reduced by the elimination of those cells that are not within the present range size and shape features.

Manual and automatic bacterial counting methods were then compared. For manual calculation, particularly in later hours of infection when the bacterial replication occurs, it is very difficult to have accurate manual counting as lumps of overlapping bacteria start to appear in the cells. Therefore, an approximate count is determined by calculating the total area of the lumps and dividing it by the expected size of a single bacterium cell. This was accepted as a reasonable count in such cases. A comparative analysis of bacteria counting is shown in Table 4:

TABLE 4

| Cell Index | Actual Bacteria Count | Measured Bacteria Count | Error | Standard Deviation |
|---|---|---|---|---|
| 1 | 12 | 11 | −0.1 | 0.66 |
| 2 | 7 | 7 | 0 | 0.00 |
| 3 | 2 | 3 | 1 | 0.33 |
| 4 | 4 | 4 | 0 | 0.66 |
| Mean/error (100 cells) | 3/cell | 3/cell | 0 | 0.33 |

It is important to note that there was a small standard deviation among the three manual counts of the bacteria in the same datasets.

Cell features were identified for both infected and control cells. Features measured for control cells were normalized, with the presumption of normal distribution, using Jain and Dubes method of normalization. The normalize feature value, $\tilde{f}_i$, is given by:

$$\tilde{f}_i = \frac{f_{ui} - \mu_{ui}}{3\sigma_{ui}} + 1$$

Where $f_{ui}$ is the set of values of the ith feature for the control cells and $(\mu_{ui}, \sigma_{ui})$ are the mean and standard deviation describing the distribution of the control cell features. The measured feature would, therefore, have a probability of 68% to be the in the range of [−1,1]. Rescaling the distribution (for example, by 2) would increase the probability to 99%.

The mean and standard deviation were used to normalize the measured features of the infected cells, which were analyzed and results shown in U. ADIGA et al., "Mapping Infected Cell Phenotypes," IEEE Trans. Biomed. Eng. Vol. 59 (2012) 2362-2371, the teachings incorporated herein by reference, in its entirety.

While the present invention has been illustrated by a description of various embodiments, and while these embodiments have been described in some detail, they are not intended to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with methods of practicing the present invention as currently known. However, the invention itself should only be defined by the appended claims.

What is claimed is:

1. A method of classifying, with a computer processor, at least one feature of each of a plurality of cells from a low contrast, digital image representing the plurality of cells, the method comprising:

generating a contrast-enhanced image by filtering the low contrast, digital image with a high-pass filter;

smoothing the contrast-enhanced image with a first low-pass filter;
generating a background image from the low contrast, digital image;
subtracting the background image from the smoothed, contrast-enhanced image to generate an analysis image; and
identifying the at least one feature in the analysis image, the at least one feature selected from the group consisting of bacterial infection, cellular size, cellular shape, cellular boundary, and cellular edge.

2. The method of claim 1, wherein generating the background image comprises at least one of smoothing the received low contrast, digital image with a second low-pass filter, clipping negative pixel values to zero, and rescaling image contrast.

3. The method of claim 1, wherein the at least one feature is bacterial infection, the method further comprising:
detecting a boundary of each of the plurality of cells;
distinguishing an uninfected cellular region from an infected cellular region within the detected boundary of each of the plurality of cells;
detecting a plurality of peak fluorescence intensities within the infected cellular region; and
comparing each of the plurality of peak fluorescence intensities to an ideal bacteria fluorescence profile; and
identifying at least one of the plurality of peak fluorescent intensities as representing bacteria.

4. The method of claim 3, wherein detecting the boundary of each of the plurality of cells further comprises:
identifying a nuclear region for each of the plurality of cells by:
applying a low-pass filter to the low contrast, digital image;
segmenting the nuclear region with a watershed region-growing algorithm; and
merging fragments of the nuclear region to parent objects of the nuclear region to form a nuclear mask; and
growing a cytoplasm region for each of the plurality of cells by:
applying a low-pass filter to the low contrast, digital image;
layering the low-pass filtered digital image with the nuclear mask;
selecting a pixel proximate to the nuclear mask; and
iteratively growing the cytoplasm region from the selected pixel to a pixel having a signal indicative of a cell membrane.

5. The method of claim 1, further comprising:
receiving the low contrast, digital image.

6. The method of claim 5, wherein the low contrast, digital image is a Hoescht-stained image, a deep red-stain image, or a GFP-labeled image.

7. The method of claim 1, wherein the cell feature includes at least one heuristic feature.

8. The method of claim 7, wherein heuristic features include multi-scale features, invariant moment features, statistical texture features, Laws texture features, differential features of the intensity surface, frequency domain features, histogram distribution features, local binary pattern image features, local contrast pattern image features, spottiness, Chi-square distance, Chi-square distance between concentric circular areas within the cell, and gray-class distance.

9. A plurality of cellular feature protocols, each protocol of the plurality configured to classify at least one phenotypic feature of an infected cell and comprising:

an imaging protocol having instructions, executable by a processor, for generating at least one low contrast, digital image representing the infected cell;
an image processing protocol having instructions for processing and enhancing the at least one low contrast, digital image in accordance with the method of claim 1; and
at least one model applied to the processed and enhanced at least one low contrast, digital image and configured to return a classification of the at least one phenotypic feature.

10. The plurality of cellular feature protocols of claim 9, wherein the enhancing the at least one low contrast, digital image of the image processing protocol comprises:
generating a contrast-enhanced image by filtering the low contrast, digital image with a high-pass filter;
smoothing the contrast-enhanced image with a first low-pass filter;
generating a background image;
subtracting the background image from the smoothed, contrast-enhanced image to generate an analysis image.

11. The plurality of cellular feature protocols of claim 9, wherein the at least one model includes an algorithm configured to compare the at least one phenotypic feature to a library of ideal phenotypic features.

12. The plurality of cellular feature protocols of claim 9, wherein the at least one low contrast, digital image is a fluorescent digital image.

13. An image analysis system comprising:
the plurality of cellular feature protocols of claim 9, each protocol of the plurality comprising instructions, executable by a processor, for processing and enhancing low contrast images representing cells for analyzing and classifying a feature of the imaged cells;
a calculating unit programmed with a computer program product configured to process and enhance the low contrast images according to a protocol selected from the plurality of cellular feature protocols.

14. A method of mapping, with a computer processor, cells infected with bacteria configured to emit fluorescence from a low contrast, digital image representing the infected cells, the method comprising:
detecting a boundary for each of the infected cells;
distinguishing an uninfected cellular region from an infected cellular region;
detecting a plurality of peak fluorescence intensities within the infected cellular region; and
comparing each of the plurality of peak fluorescence intensities to an ideal bacterial fluorescence profile; and
identifying at least one of the plurality of peak fluorescent intensities as representing bacteria.

15. The method of claim 14, further comprising:
receiving the low contrast, digital image.

16. The method of claim 14, wherein detecting the boundary for each of the infected cells further comprises:
identifying a nuclear region for each of the plurality of cells by:
applying a low-pass filter to the low contrast, digital image;
segmenting the nuclear region with a watershed region-growing algorithm; and
merging fragments of the nuclear region to parent objects of the nuclear region to form a nuclear mask; and
growing a cytoplasm region for each of the plurality of cells by:

applying a low-pass filter to the low contrast, digital image;
layering the low-pass filtered digital image with the nuclear mask;
selecting a pixel proximate to the nuclear mask; and
iteratively growing the cytoplasm region from the selected pixel to a pixel having a signal indicative of a cell membrane.

17. The method of claim 16, wherein the low contrast, digital image for identifying the nuclear region is a Hoescht-stained image.

18. The method of claim 16, wherein the low contrast, digital image for identifying the cytoplasm region is a deep red-stain image.

19. The method of claim 14, wherein the low contrast, digital image for detecting the plurality of peak fluorescence intensities is a GFP-labeled image.

* * * * *